United States Patent
Sung et al.

(10) Patent No.: US 9,083,630 B2
(45) Date of Patent: Jul. 14, 2015

(54) METHOD AND APPARATUS FOR SUPPORTING MULTICAST BROADCAST SERVICE (MBS) IN WIMAX

(75) Inventors: Su Lyun Sung, Anyang-Si (KR); Bong Ho Kim, San Jose, CA (US)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 563 days.

(21) Appl. No.: 12/864,483

(22) PCT Filed: Jan. 23, 2009

(86) PCT No.: PCT/KR2009/000386
§ 371 (c)(1),
(2), (4) Date: Jul. 23, 2010

(87) PCT Pub. No.: WO2009/093876
PCT Pub. Date: Jul. 30, 2009

(65) Prior Publication Data
US 2010/0302989 A1     Dec. 2, 2010

Related U.S. Application Data

(60) Provisional application No. 61/023,681, filed on Jan. 25, 2008, provisional application No. 61/025,871, filed on Feb. 4, 2008.

(30) Foreign Application Priority Data

Jan. 23, 2009  (KR) .................. 10-2009-0006364

(51) Int. Cl.
*H04L 12/761*  (2013.01)
*H04L 12/18*   (2006.01)
*H04W 4/06*    (2009.01)

(52) U.S. Cl.
CPC .............. *H04L 45/16* (2013.01); *H04L 12/189* (2013.01); *H04W 4/06* (2013.01)

(58) Field of Classification Search
CPC ...... H04L 12/185; H04L 12/189; H04W 4/06
USPC .......................................... 370/312
See application file for complete search history.

(56) References Cited

U.S. PATENT DOCUMENTS

2006/0034278 A1* 2/2006 Hundscheidt et al. ........ 370/390
2007/0086380 A1  4/2007 Lim et al.
(Continued)

FOREIGN PATENT DOCUMENTS

JP  2007228450 A  9/2007
KR  20050007804 A  1/2005
(Continued)

OTHER PUBLICATIONS

P802.16Rev2/D2 (Dec. 2007) "Draft Standard for Local and metropolitan area networks; Part 16: Air Interface for Broadband Wireless Access Systems", IEEE, entire document.*

(Continued)

*Primary Examiner* — Joseph Bednash (57) ABSTRACT

Disclosed is a mobile internet system, and more particularly, to a method and apparatus for supporting a multicast broadcast service (MBS) over WIMAX. The MBS supporting method of the present invention comprises assigning a first GRE key to a first MBS service flow for a first MS, and delivering MBS contents having the first MBS service flow through the use of first GRE key; and if a second MBS service flow for a second MS is the same as the first MBS service flow, delivering MBS contents having the second MBS service flow through the use of first GRE key pre-assigned to the first MBS service flow.

20 Claims, 4 Drawing Sheets

(56) References Cited

U.S. PATENT DOCUMENTS

| | | |
|---|---|---|
| 2007/0121615 A1* | 5/2007 | Weill et al. .................... 370/389 |
| 2007/0211726 A1* | 9/2007 | Kuang et al. ............... 370/395.3 |
| 2008/0205343 A1* | 8/2008 | Qian et al. .................... 370/331 |
| 2009/0103466 A1* | 4/2009 | Gu et al. ........................ 370/312 |
| 2009/0103467 A1* | 4/2009 | Barber et al. ................. 370/312 |

FOREIGN PATENT DOCUMENTS

| | | |
|---|---|---|
| KR | 20050017046 A | 2/2005 |
| WO | 03003650 A2 | 1/2003 |
| WO | 2004036849 A2 | 4/2004 |
| WO | 2006070992 A1 | 7/2006 |
| WO | WO 2007051426 A1 * | 5/2007 |

OTHER PUBLICATIONS

Fenner, "Internet Group Management Protocol, Version 2", Oct. 23, 1997, IETF, draft-ietf-idmr-igmp-v2-07.txt.*

Deering et al., "Multicast Listener Discovery (MLD) for IPv6", Jun. 1999, IETF, draft-ietf-ipngwg-mld-02.txt.*

IEEE 802.16e-2005 standard, P802.16Rev2/D2 (Dec. 2007) "Draft Standard for Local and metropolitan area networks; Part 16: Air Interface for Broadband Wireless Access Systems", pp. 457-459.*

* cited by examiner

METHOD AND APPARATUS FOR SUPPORTING MULTICAST BROADCAST SERVICE (MBS) IN WIMAX

REFERENCE TO PRIORITY APPLICATIONS

The present application is the U.S. national stage of PCT International Patent Application No. PCT/KR2009/000386, filed Jan. 23, 2009, which claims the benefit of U.S. Provisional Patent Application Nos. 61/023,681, filed Jan. 25, 2008, and 61/025,871, filed Feb. 24, 2008. The present application also claims the benefit of Republic of Korea Patent Application No. 10-2009-0006364, filed Jan. 23, 2009. The disclosures of the above applications are hereby incorporated by reference in their entireties into the present application.

TECHNICAL FIELD

The present invention relates to a mobile internet system, and more particularly, to a method and apparatus for supporting a multicast broadcast service (MBS) over WIMAX.

BACKGROUND ART

There is the increasing interest in "point-to-multipoint service" for providing the same contents to multiple users over network via one link, that is, multicast/broadcast service (hereinafter, referred to as "MBS").

In a broadband wireless communication system based on IEEE (Institute of Electrical and Electronics Engineers) 802.16d/e or WiMAX standard, the MBS enables to provide the same data to multiple subscribers. The MBS may be largely classified into a multicast service and a broadcast service, wherein the multicast service allows the user to dynamically join and leave an IP session, and the broadcast service always distributes multicast contents without consideration for the user.

In case of the MBS, the same MBS contents should be delivered to multiple mobile stations (MSs) with the same multicast CID (hereinafter, referred to as "MCID"). Also, base stations (BS) within an MBS zone should support Macro Diversity. Thus, there should be little difference in delivery time. In this case, a reuse frequency coefficient may use "1".

Also, a generic routing encapsulation (GRE) tunnel should be used for a data exchange between the BS and an access service network (ASN).

For a unicast transmission over IEEE 802.16e and WiMAX, a data path granularity for creation of the GRE tunnel may be the following three, that is, per-MS granularity, per-BS granularity, and per-SF (service flow) granularity.

First, the per-MS granularity creates the GRE tunnel per every MS. In this case, a GRE key is assigned through the use of 5-tuple data packet, that is, destination IP address, source IP address, source port, destination port, and protocol value; and then the GRE tunnel is created through the use of assigned GRE key. After that, the data is delivered to the BS via the GRE tunnel assigned per every MS.

Second, the per-BS granularity creates the GRE tunnel per every BS without consideration for the MS registered in the BS. Then, the data is delivered to the corresponding BS via the GRE tunnel created per every BS.

Third, the per-SF granularity creates the GRE tunnel per every service flow included in each MS. Also, the data path granularity is established together with creation of the data path. Thus, a GRE key is assigned based on the established data path granularity; and then a GRE tunnel is created through the use of assigned GRE key. Then, the data is delivered via the GRE tunnel created per every service flow included in each MS.

The aforementioned three data path granularities are for the unicast transmission. Accordingly, if the multicast data for the MBS is delivered by the aforementioned unicast transmission methods, the following problems may occur.

First, if using the per-MS granularity, the destination IP address of multicast data packet is not IP address but group address, so that it is impossible to create the GRE tunnel per every MS, that is, it is impossible to support the MBS. The GRE tunnel may be created per every MS by additionally providing an MS ID in addition to the aforementioned 5-tuples. However, it cannot ensure QoS (quality of service) for the other MBS contents requiring the other QoS parameters.

If using the per-BS granularity, it is impossible to classify the multicast data packet at R6 interface between the BS and ASN-GW. Thus, it cannot ensure QoS (quality of service) for the multicast data.

If using the per-SF granularity, the GRE tunnel is created per every service flow included in each MS. In this case, the unnecessary GRE tunnel is created for transmission of the same multicast data by the MSs registered in the multicast group. Accordingly, the unnecessary multicast data transmission occurs so that unnecessary network resources are consumed.

DISCLOSURE

Technical Problem

Therefore, the present invention has been made in view of the above problems, and it is an object of the present invention to provide a method and apparatus for supporting a multicast broadcast service (MBS), which is capable of preventing one or more problems of the related art.

Another object of the present invention is to provide a method for creating a GRE tunnel so as to support the MBS.

Another object of the present invention is to provide a method for supporting the MBS appropriate for WiMAX.

Technical Solution

To achieve these objects and other advantages and in accordance with the purpose of the invention, as embodied and broadly described herein, there is provided an MBS supporting method comprising: assigning a first GRE key to a first MBS service flow for a first MS, and delivering MBS contents having the first MBS service flow through the use of first GRE key; and if a second MBS service flow for a second MS is the same as the first MBS service flow, delivering MBS contents having the second MBS service flow through the use of first GRE key pre-assigned to the first MBS service flow.

In another aspect of the present invention, there is provided an MBS supporting method comprising: assigning a first GRE key to a first MBS service flow requesting a first QoS, and delivering MBS contents having the first MBS service flow through the use of first GRE key; and assigning the first GRE key to a second MBS service flow requesting the first QoS, and delivering MBS contents having the second MBS service flow through the use of first GRE key.

In another aspect of the present invention, there is provided an MBS supporting method comprising: granting one MCID to an MBS program including multiple channels with the same Qos; assigning one GRE key to the MCID; and providing an MBS service through the use of GRE key.

In another aspect of the present invention, there is provided an MBS supporting method comprising: assigning a first GRE key to a first MBS service flow for a first MS, and creating a GRE tunnel for the first MBS service flow through the use of first GRE key; if a second MBS service flow for a second MS, wherein the second MS is registered in the same MBS group as the first MS, is identical to the first MBS service flow, assigning the first GRE key to the second MBS service flow; and delivering MBS contents having the first MBS service flow, and MBS contents having the second MBS service flow through the use of GRE tunnel created through the first GRE key.

In a further aspect of the present invention, there is provided an MBS supporting apparatus comprising: a receiving means for receiving service flow information for MBS service flows; a GRE key assigning means for assigning a first GRE key to a first MBS service flow for a first MS registered in an MBS group through the use of service flow information; and, if a second MBS service flow for a second MS is identical to the first MBS service flow, assigning the first GRE key to the second MBS service flow; and delivering the first GRE key.

Advantageous Effects

According to the present invention, a method and apparatus for supporting an MBS is capable of satisfying current IEEE 802.16d/e and WiMAX standard.

When supporting the MBS, MBS contents can be delivered to multiple MSs through the use of shared GRE tunnel so that it is possible to decrease the number of GRE tunnels.

In addition, it can satisfy QoS parameters of MBS contents service flow when supporting the MBS.

Also, network resource can be efficiently used on delivery of the MBS contents service flow.

BEST MODE

Reference will now be made in detail to the preferred embodiments of the present invention, examples of which are illustrated in the accompanying drawings. Wherever possible, the same reference numbers will be used throughout the drawings to refer to the same or like parts.

For provision of an MBS according to the present invention, a GRE tunnel is created in such a manner that it is shared at R6 interface between ASN-GW and BS, or R4 interface between ASG-GWs. On assignment of a GRE key for creation of the GRE tunnel, both 'per-BS granularity' and 'per-SF granularity' are under consideration.

Hereinafter, a method and apparatus for supporting an MBS according to the present invention will be described with reference to the accompanying drawings.

Figure 1:
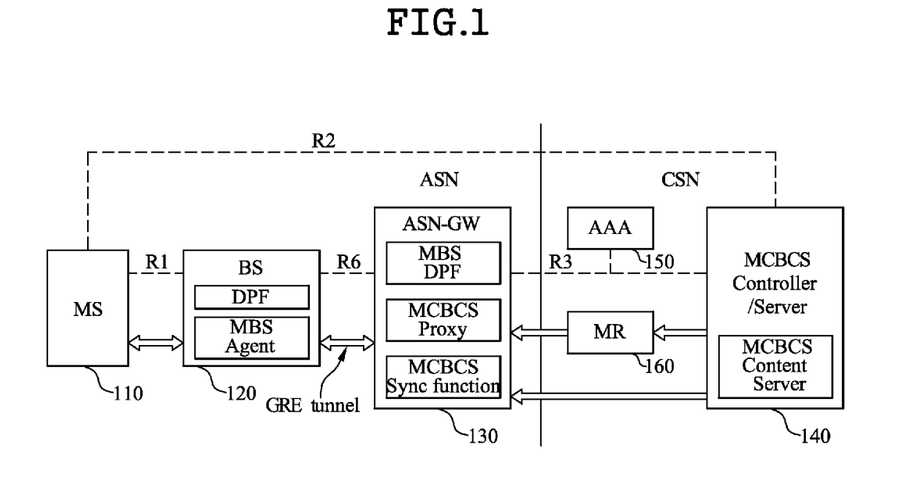
FIG. 1 illustrates a WiMAX system scheme based on IEEE 802.16d/e and WiMAX standard.

FIG. 1 illustrates a WiMAX system scheme based on IEEE 802.16d/e and WiMAX standard. Referring to FIG. 1, a WiMAX system comprises a mobile station (MS) 110, a base station (BS) 120, an access service network (ASN), and a connectivity service network (CSN).

The CSN comprises an MCBCS controller/server 140, an authentication authorization and accounting (AAA) 150, and a multicast router (MR) 160. The MCBCS controller/server 140 comprises an MCBCS contents server for providing MBS contents. At this time, the CSN may be classified into a visiting-CSN and a home-CSN. Although not shown, the WiMAX system may comprise an application service provider and an IP network.

In the aforementioned structure, the MCBCS contents server is included in the MCBCS controller/server 140. However, it is merely the illustrative example. The MCBCS contents server may be separately provided from the MCBCS controller/server 140.

The ASN provides a radio access infrastructure to a service provider of network. Also, the ASN comprises an ASN-GW for delivering multicast contents received from the MCBCS controller/server 140. In this case, the MBS contents can be delivered from the ASN to the BS 120 via the GRE tunnel created between the BS 120 and the ASN-GW 130. For this, MCBCS Proxy of the ASN-GW assigns a multicast CID (MCID) for transmission of the MBS contents. In another embodiment of the present invention, the MCBCS Proxy of the ASN-GW may assign a multicast service flow ID (MS-FID) for transmission of the MBS contents. Also, an MBS DPF (data path function) can perform a control information procedure for creation of the GRE tunnel, wherein the MBS DPF interworks with a data path function (DPF) of the BS.

The AAA 150 performs service authorization, authentication and accounting of the MS connected to the network. The MR 160 delivers the multicast contents, which is provided from the MCBCS contents server of the MCBCS controller/server 149, to the ASN-GW 130.

In the WiMAX system with the aforementioned structure, the MS 110 and the BS 120 are connected to each other via R1 interface; the BS 120 and the ASN-GW 130 are connected to each other via R6 interface; and the ASN-GW 130 and the CSN are connected to each other via R3 interface.

In the WiMAX system of FIG. 1, the MS registered in the specific multicast service can request to receive the corresponding multicast service (MBS). If there is the request for the multicast service from the MS, the MCBCS controller/server 140 checks the service authorization, authentication and accounting of the MS through the AAA 150.

Then, when it is checked that the MS is registered in the corresponding multicast service, the MCBCS controller/server 140 delivers the MBS contents included in the MCBCM contents server to the ASN-GW 130 via the MR 160.

For delivering the MBS contents from the ASN-GW 130 to the MS, the GRE tunnel should be created between the ASN-GW 130 and the BS 120. Also, a dynamic service addition based on the service flow of the corresponding MBS contents should be provided between the BS 120 and the MS 110.

In the present invention, there is proposed a method for creating the GRE tunnel to support the MBS in the WiMAX system scheme shown in FIG. 1. The present invention proposes methods for creating the shared GRE tunnel, and delivering one MBS contents or at least one MBS contents including the same QoS parameter via the shared GRE tunnel.

Figure 2:
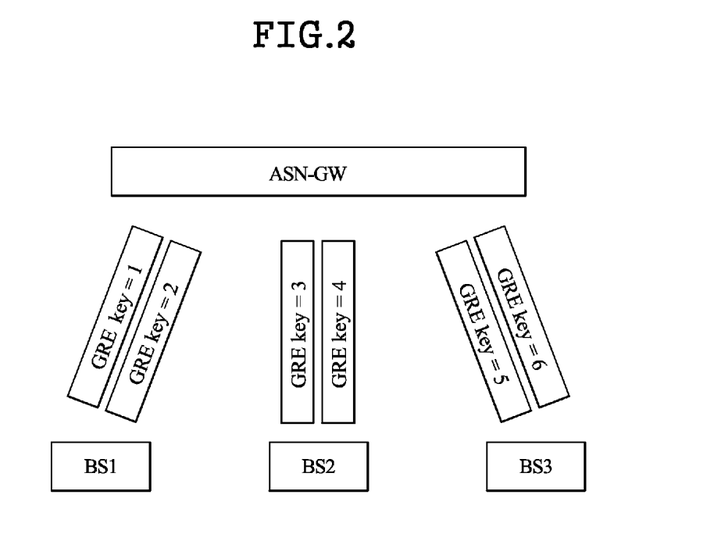
FIG. 2 illustrates a GRE tunnel creation method according to embodiments of the present invention.

FIG. 2 illustrates a GRE tunnel creation method according to embodiments of the present invention.

For creation of the GRE tunnel between the ASN-GW 130 and the BS 120, a GRE key is assigned in the BS. In the present invention, the GRE key may be assigned in the ASN-GW. The following example shows that the GRE key is assigned in the BS.

In the present invention, the GRE key is assigned in consideration for the per-BS granularity and per-SF granularity. In case of one BS (BS1) among the BSs of FIG. 2, the GRE key 1 is assigned to the same MBS contents with the first service flow, and then the GRE tunnel is created through the use of assigned GRE key. Also, the GRE key 2 is assigned to the same MBS contents with the second service flow, and then the GRE tunnel is created through the use of assigned GRE key.

The GRE key assignment is performed per every BS, and the GRE key is assigned per every service flow for the MBS. On delivery of the MBS contents with the same service flow, the created GRE tunnel can be shared.

There have been proposed methods of the present invention for assigning the GRE key to create the GRE tunnel, as follows. Hereinafter, MBS supporting methods according to the embodiments of the present invention based on the WiMAX system scheme of FIG. 1 will be explained with reference to FIGS. 3 to 6.

Figure 3:
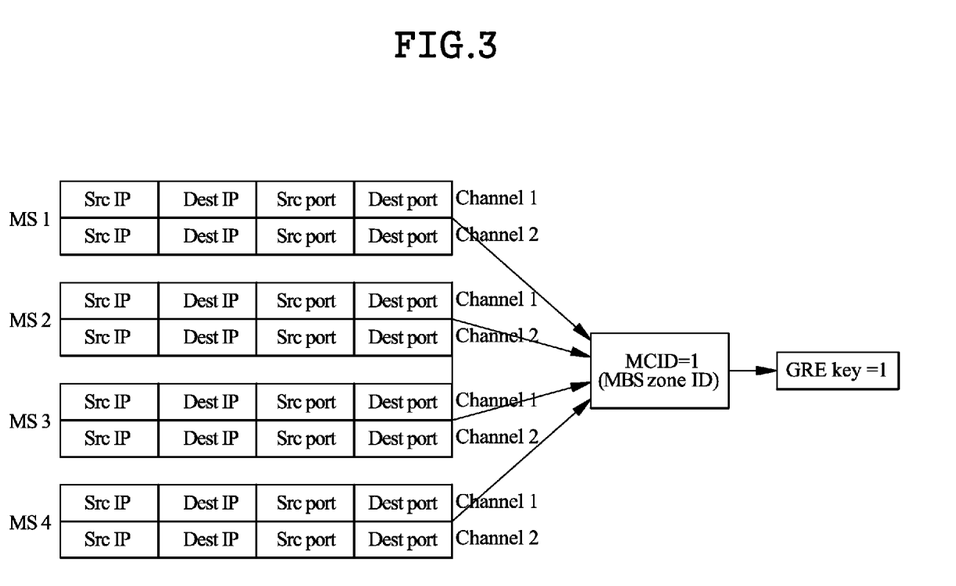
FIG. 3 illustrates an MBS supporting method according to the first embodiment of the present invention.

FIG. 3 illustrates an MBS supporting method according to the first embodiment of the present invention.

Referring to FIG. 3, the GRE key is assigned in the BS through the use of MCID (Multicast CID), and the GRE tunnel is created through the use of assigned GRE key. In the first embodiment of the present invention, the GRE key may be assigned in the ASN-GW 130.

In FIG. 3, Src IP(Source IP), Dest IP(Destination IP), Src port(Source Port), and Dest port(Destination port) included in the MBS data packet of the MBS content indicate the service flow of the MBS contents to be delivered.

If the MS1, MS2, MS3 and MS4 are registered in the same MBS group, the respective MSs have the same service flow. If the respective MSs have the same service flow, the same MCID is granted to the MBS contents delivered to the respective MSs, and more particularly, to the MBS data packet.

In the first embodiment of the present invention, the same MCID is granted to the same service flows, and the GRE key is assigned through the use of same MCID.

At this time, the MCID (multicast content identifier) indicates an identifier for the MBS contents. The MCID is assigned in the MCBCS proxy of the ASN-GW 130 through the use of SFID received from Anchor SFA establishing an initial network entry with each MS. At this time, the MCID has a unique value in the MBS zone. Thus, it is possible to classify the MBS contents to be delivered to the MS and the MS group to be delivered with the MBS contents in the same MBS zone through the use of MCID.

In the first embodiment of the present invention, as explained above, the GRE key is assigned in the BS 120 or ASN-GW 130 through the use of MCID having the unique value in the same MBS zone, and the GRE tunnel is created between the BS 120 and the ASN-GW 130 through the use of assigned GRE key.

If creating the GRE tunnel by the aforementioned method, one GRE tunnel for the same MBS contents are created per every BS in the same MBS zone. Through the created GRE tunnel, the same MBS contents can be delivered to the multiple MSs. Since the same MBS contents have the same service flow, it can satisfy QoS according to the multicast broadcast transmission.

If trying to deliver the MBS contents to the other service flow instead of the service flow of FIG. 3, the GRE keys whose number corresponds to the number of service flows are assigned in the BS 120 or ASN-GW 130, and then the GRE tunnels whose number corresponds to the number of service flows are created through the use of assigned GRE keys. Thus, it can satisfy QoS according to the multicast transmission of the multiple MBS contents with the different service flows.

Meanwhile, it is not necessary that the ASN-GW 130 is included in one MBS zone. If needed, the ASN-GW 130 may be included in the multiple MBS zones.

In more detail, if the service is provided in the other MBS zone over the network, the same MBS contents may be regarded as the different MBS contents. Thus, the different MCIDs may be granted to the same MBS contents, or the same MCID may be granted to the different MBS contents. For example, if the ASN-GW is included in the MBS zone 1 and MBS zone 2, the ASN-GW may grant the same MCID values to the two MBS contents serviced in the MBS zone 1 and MBS zone 2. At this time, the two MBS contents may be the same or different. In order to identify the respective MBS contents, both the MCID and MBS zone ID are necessary. Also, if trying to the different GRE tunnels for the respective MBS contents, both the MCID and MBS zone values are necessarily required.

If the same MCID is granted to the different MBS contents, it cannot satisfy QoS for the respective MBS contents with the different service flows. Also, even though the same MBS contents are provided to the multiple MBS zones, variable QoS parameters or multicast methods may be applied based on the properties and circumstances of the MBS zone. In this case, it cannot satisfy QoS for the respective MBS contents.

The first embodiment of the present invention proposes the following for satisfying QoS according to the service flow of the MBS contents even in case that the ASN-GW is included in the multiple MBS zones.

In the first embodiment of the present invention, if the ASN-GW is included in the multiple MBS zones, both the MCID and MBS zone ID should be considered as the identifier for assigning the GRE key. Thus, the GRE key is assigned per every service flow of the MBS contents identified by the MCID and MBS zone ID; and the GRE tunnel is created between the BS and the ASN-GW through the use of assigned GRE key. That is, if the ASN-GW is included in the multiple MBS zones, the GRE tunnel can be shared among the same MBS contents through the use of MCID and MBS zone ID. At this time, the MBS zone ID indicates an identifier value for identifying the MBS zone.

Through the shared GRE tunnel, the MBS contents having the same QoS parameter can be delivered, so that it is possible to satisfy QoS according to the service flow of the respective MBS contents.

As mentioned above, the GRE tunnel is created based on the MCID. If programs have the same QoS parameter, the corresponding program is mapped to the MCID, wherein the corresponding program may include multiple channels. At this time, the respective channels can be identified by a contents identifier or a channel identifier of an upper layer. The identifier may be a logical identifier. Also, each channel of the program may be mapped to one multicast IP address or another multicast IP address. Thus, if the channels of the program include the same QoS parameter, one GRE tunnel may be created for the multiple channels, and the channels associated with the program including the same QoS parameter may be delivered through one GRE tunnel.

Figure 4:
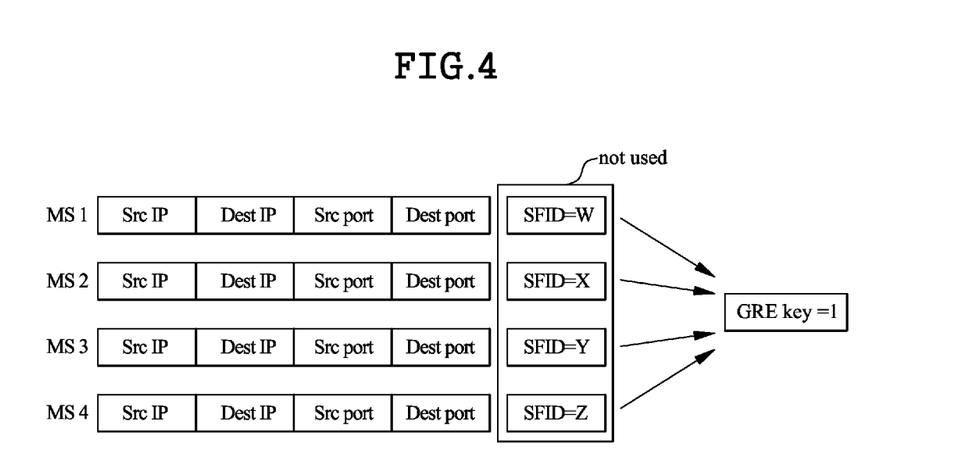
FIG. 4 illustrates an MBS supporting method according to the second embodiment of the present invention.

FIG. 4 illustrates an MBS supporting method according to the second embodiment of the present invention.

Referring to FIG. 4, the service flow for providing the MBS contents to the MSs is created by assigning the SFID in the same method as a unicast packet. In case of the unicast packet, the respective MSs have the different Destination IP addresses, whereby the GRE tunnel may be created per every MS according to the Destination IP address.

However, if the first to fourth MSs (MS1, MS2, MS3, MS4) shown in FIG. 4 are registered in a specific multicast group of the same BS, the MBS contents are provided in such a way that the same MBS contents are delivered to all MSs (MS1, MS2, MS3, MS4) which require a specific multicast service. In this case, the Destination IP address may be not an MS IP address but a multicast group address.

In the second embodiment of the present invention, the GRE tunnel is created in consideration for the transmission property of the MBS contents service flow. In the second embodiment of the present invention, the GRE tunnel for the MBS contents service flow may be created per every BS without using the SFID.

In more detail, if the same MBS contents service flow is provided to the multiple MSs, each of the MSs is provided with the same Source IP, Destination IP, Source Port and Destination Port. Thus, the GRE key is assigned through the use of Source IP, Destination IP, Source Port and Destination Port without regard to the SFID. At this time, the GRE key is assigned in the BS. However, the GRE key may be assigned in the ASN-GW. Through the use of assigned GRE key, the GRE tunnel is created between the BS and the ASN-GW. Then, the same MBS contents with the same service flow can be delivered through the GRE tunnel. Accordingly, the MBS supporting method according to the second embodiment of the present invention can share the GRE tunnel, and simultaneously satisfy QoS according to the service flow of the MBS contents.

Figure 5:
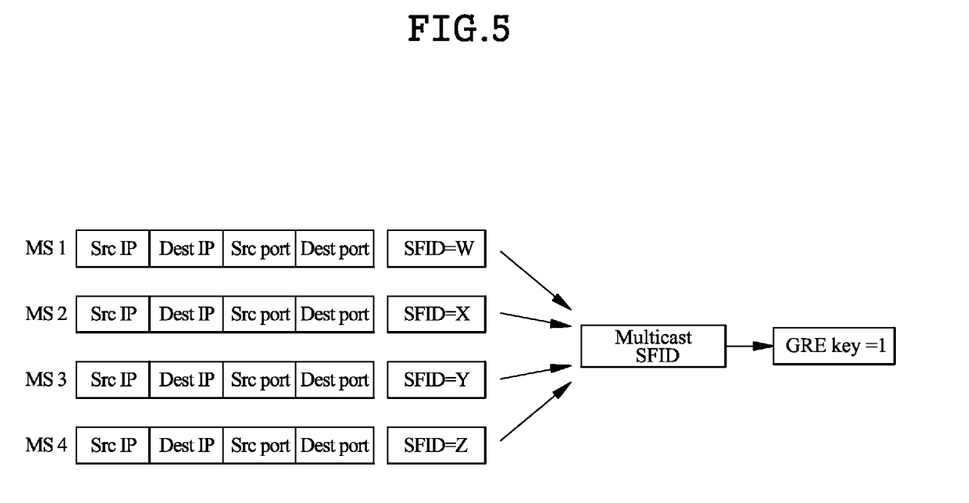
FIG. 5 illustrates an MBS supporting method according to the third embodiment of the present invention.

FIG. 5 illustrates an MBS supporting method according to the third embodiment of the present invention.

Referring to FIG. 5, if the first to fourth MSs (MS1, MS2, MS3, MS4) are registered in a specific multicast group of the same BS, the service flow for providing the corresponding MBS contents to the respective MSs is created by assigning "SFID=W, SFID=X, SFID=Y, SFID=Z" in the same method as a unicast packet.

Basically, when creating the data path and service flow of the MBS contents, the SFID is assigned in Anchor SFA establishing an initial network entry with each MS. At this time, the Anchor SFA is positioned in the ASN-GW establishing a network entry with each MS. Even when the MS is positioned in the other ASN area by handover, the SFID is assigned in the Anchor SFA of the ASN-GW establishing the initial network entry with each MS.

Even though the respective MSs are currently positioned in the same ASN area, their Anchor ASN-GWs establishing the initial network entry may be different. In this case, even if the same MBS contents service flow is provided to the first to fourth MSs (MS1, MS2, MS3, MS4), the different SFIDs may be assigned by the Anchor SFAs of the respective MSs. In case of the service flows having the same MBS contents to be delivered to the MSs, even though the different SFIDs are assigned by the Anchor SFAs of the respective MSs, the service flows are mapped to one multicast SFID. That is, one multicast SFID is assigned per every same service flow in the same MBS zone. At this time, the multicast SFID is assigned in the ASN-GW of the MBS zone in which the first to fourth MSs (MS1, MS2, MS3, MS4) are positioned.

Then, the GRE key is assigned through the use of multicast SFID assigned in the ASN-GW. At this time, the GRE key may be assigned in the BS or ASN-GW.

Through the use of assigned GRE key, one GRE tunnel is created between the BS and the ASN-GW per every same service flow; and the MBS contents with the same service flow is delivered through the created GRE tunnel.

Figure 6:
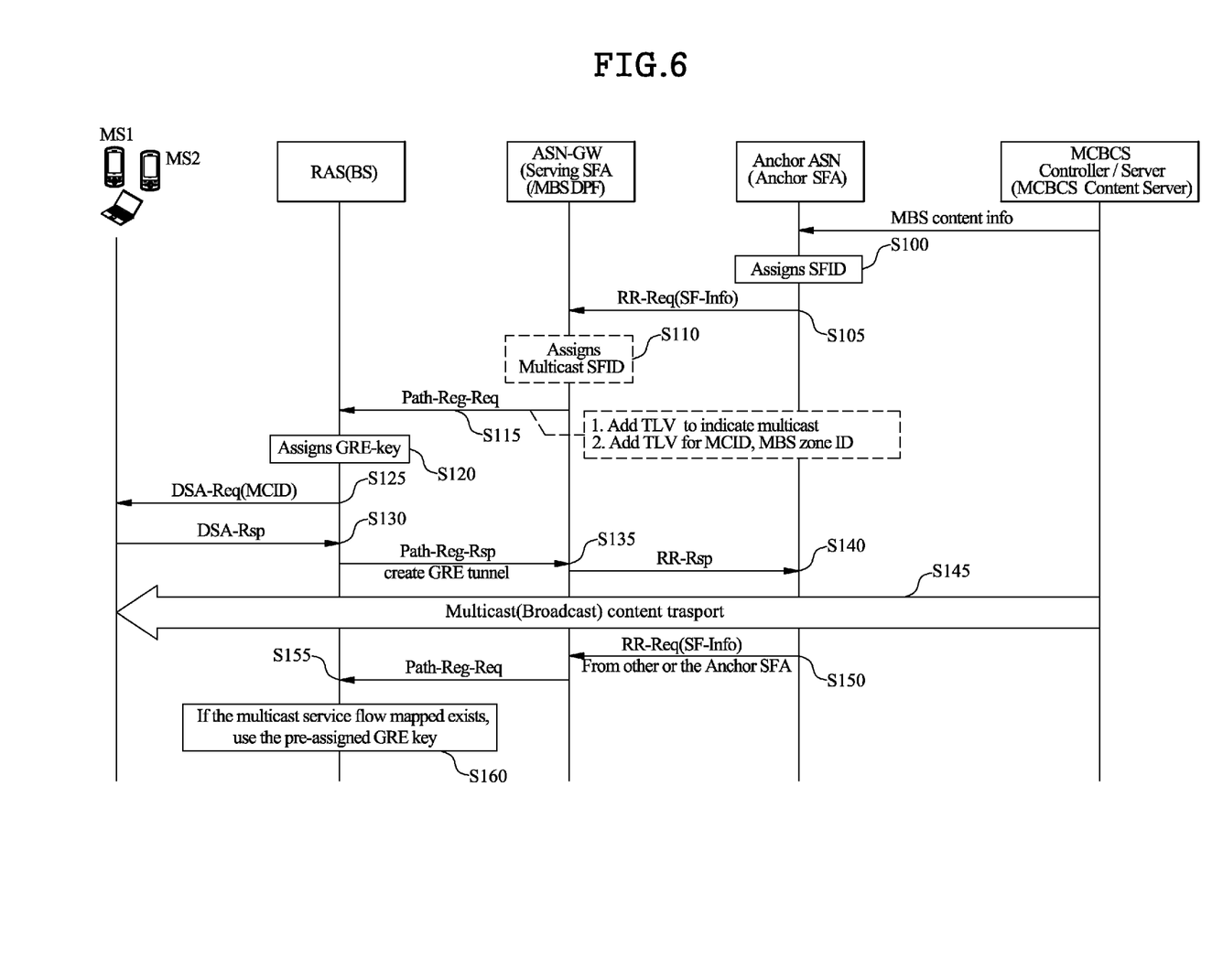
FIG. 6 is a flow chart illustrating the MBS supporting method according to the embodiments of the present invention.

FIG. 6 illustrates a flow chart showing the MBS supporting method according to the embodiments of the present invention. Except the procedure of assigning the GRE key, the MBS supporting method of FIG. 6 is identical to the other MBS supporting methods according to the other embodiments of the present invention.

FIG. 6 illustrates the example where the GRE key is assigned in the BS. However, the GRE key may be assigned in the ASN-GW. Even if the GRE key is assigned in the ASN-GW, the procedural change can be easily realized and understood by those skilled in the art.

In order to deliver the MBS contents to the multiple MSs registered in the specific MBS, a dynamic service addition (DSA) should be made between the BS and the MS, as shown in FIG. 6. Also, the GRE tunnel should be created between the BS and the ASN (ASN-GW).

First, Anchor SFA establishing the initial network entry with the first MS among the multiple MSs receives information about the MBS contents, and then assigns the SFID for the service flow of the MBS contents to be delivered to the MSs through the use of received information about the MBS contents (S100).

Then, the Anchor SFA delivers a RR-Req message to a serving ASN-GW, wherein the RR-Req message requests to create the data path for transmission of the MBS contents (S105). At this time, service flow information (SF-info) having the SFID for each MS is included in the RR-Req message.

Then, the ASN-GW receiving the RR-Req message from the Anchor SFA delivers a data path creation request (Path-Reg-Req) message for creating the data path and service flow to the BS (S115). At this time, the Path-Reg-Req message includes the SFID received from the Anchor SFA.

In the first embodiment of the present invention, when the ASN-GW receives the RR-Req message from the Anchor SFA, the ASN-GW creates information about MCID, MBS zone ID and data type through the use of received SFID. Furthermore, the Path-Reg-Req message includes the information about MCID, MBS zone ID and data type.

At this time, the SFID is assigned by the MCBCS Proxy within the ASN-GW of FIG. 1. Also, the information about MCID, MBS zone ID and data type may be created as TLV. In this case, the MCID TLV includes MCID information; the MBS zone ID TLV includes information about the MBS zone used for virtual access or access to the associated service flow; and the service flow type of data delivered to the MS is defined in the data type TLV. That is, the data type TLV includes information indicating that the data delivered to the MS is the unicast service or MBS.

If the same MBS contents service flow is provided to the multiple MSs, each of the MSs is provided with the same Source IP, Destination IP, Source Port and Destination Port without regard to the MS. In the second embodiment of the present invention, the GRE key is assigned through the use of Source IP, Destination IP, Source Port and Destination Port without regard to the SFID.

For this, in the second embodiment of the present invention, the RR-Req message delivered to the ASN-GW in step S105 includes the SFID together with the Source IP address, Destination IP address, Source Port, and Destination port values for defining the MBS contents transmission.

Then, the Path-Reg-Req message requesting the data path creation, that is, GRE tunnel creation is delivered to the BS (S115). At this time, the Path-Reg-Req message delivered to the BS includes the Source IP address, Destination IP, Source Port and Destination Port values. Meanwhile, if the GRE key is assigned in the ASN-GW, the ASN-GW can assign the GRE key through the use of Source IP address, Destination IP, Source Port and Destination Port values.

In the third embodiment of the present invention, even though the SFID values received from the Anchor SFA in step S105 are different from one another, the MBS contents to be delivered to the MSs may have the same service flow. In this case, the different SFID values are mapped to one multicast SFID. That is, one multicast SFID is assigned per every same service flow in the same MBS zone (S110). In the third embodiment of the present invention, the multicast SFID is included in the Path-Reg-Req message to be delivered to the BS in step S115.

After the step S115, the BS receives the Path-Reg-Req message from the ASN-GW, and assigns the GRE key based on the per-MS granularity (S120).

In the first embodiment of the present invention, one GRE key is assigned to the service flow of the same MBS content per every BS through the use of information about the MCID, MBS zone ID and data type included in the Path-Reg-Req message. That is, one GRE key is assigned to the service flows with the same MCID.

In the second embodiment of the present invention, one GRE key is assigned to the same service flow through the use of Source IP address, Destination IP address, Source Port, and Destination Port values included in the Path-Reg-Req message.

In the third embodiment of the present invention, one GRE key is assigned to the same service flow through the use of multicast SFID included in the Path-Reg-Req message.

After that, the BS delivers a DSA-Req message to the MS so as to request the dynamic service addition (DSA) for the MBS contents transmission (S125). At this time, the DSA-Req message includes the MCID.

In response to the DSA-Req message, the MS delivers the DSA-Rsp message to the BS, to thereby inform the dynamic service addition (S130).

Then, the BS delivers the Path-Reg-Rsp message to the ASN-GW in response to the Path-Reg-Req message, whereby the GRE tunnel is created (S135). That is, the BS delivers the Path-Reg-Rsp message including the GRE key value assigned in step S120 to the ASN-GW. Thus, the ASN-GW can deliver the MBS contents to the BS through the created GRE tunnel.

At this time, one GRE tunnel is created for the MBS contents with the same service flow per every BS. Also, if the multiple MBS contents require the same QoS, one GRE tunnel is created for the multiple MBS contents per every BS. That is, one GRE tunnel may be created for the service flow of the MBS contents per every BS; and one GRE tunnel may be created for the multiple MBS contents requiring the same QoS per every BS.

In response to the RR-Req message received from the Anchor SFA in step S105, the ASN-GW delivers the RR-Rsp message to the Anchor ASN (S140).

Through the aforementioned process, the dynamic service addition is performed between the first MS and the BS, and the GRE tunnel is created between the BS and the ASN-GW. Thus, the MBS contents according to the aforementioned multicast service can be delivered to the first MS registered in the specific multicast service.

When the ASN-GW receives the multicast data packet of the MBS contents, the ASN-GW classifies the multicast data packet based on a predetermined classification rule. That is, on the basis of the predetermined classification rule, the ASN-GW detects the MCID, multicast SFID, or Source IP, Destination IP, source Port, and Destination Port values which are granted to the multicast data packet according to the aforementioned first to third embodiments of the present invention.

Then, the ASN-GW detects the GRE key through the use of detected MCID, multicast SFID, or Source IP, Destination IP, source Port, and Destination Port values; and then determines the GRE tunnel corresponding to the detected GRE key. After that, the ASN-GW delivers the received multicast data packet, that is, MBS contents to the BS through the determined GRE tunnel (S145).

For the second MS among the multiple MSs, there may be the additional request of the data path creation to deliver the service flow of the MBS contents to the ASN-GW. In this case, the Anchor SFA establishing the initial network entry with the second MS among the multiple MSs receives information about the MBS contents from the AAA, and then assigns the SFID for the service flow of the MBS contents to be delivered to the MSs through the use of received information about the MBS contents. Then, the Anchor SFA of the second MS delivers the RR-Req message including the SFID for the service flow of the MBS contents to the serving ASN-GW (S150).

Thereafter, the serving ASN-GW receives the RR-Req message from the Anchor ASN; and then delivers the Path-Reg-Req message requesting the creation of GRE tunnel to the BS (S155).

According to the first to third embodiments of the present invention, the MBS contents information explained in step S100 to S115 is included in the Path-Reg-Req message.

In the first to third embodiment of the present invention, the MBS contents service flow receiving the additional transmission request is checked by detecting the MCID, multicast SFID, or Source IP, Destination IP, source Port, and Destination Port values which are granted to the multicast data packet.

Then, if the MBS contents service flow receiving the additional transmission request is identical to the MBS content service flow being delivered through the GRE tunnel created for the first MS, the previously-used GRE key is assigned without assigning the new GRE key. That is, the GRE tunnel for the service flow of the MBS contents to be delivered to the second MS is not created. In this case, the MBS contents service flow requested for the second MS is delivered through the GRE tunnel created by the pre-assigned GRE key (S160).

That is, if there is a request of data path registration for the MBS contents with the same service flow, the MBS contents service flow is delivered through the previously-created GRE tunnel without creating the new GRE tunnel.

Meanwhile, if the MBS contents service flow receiving the additional transmission request is different from the MBS contents service flow being delivered through the GRE tunnel created for the first MS, the new GRE tunnel is additionally created through the procedure of step 100 to step 145. After that, the MBS contents service flow is delivered through the newly-created GRE tunnel.

The aforementioned embodiments of the present invention can be implemented in a program command type executed by various computer means, and can be recorded in computer-readable record media. In this case, the computer-readable record media may include the program command, data file, and data architecture. The program command recorded in the record media may be especially designed for the present invention, or may be used for those who are in a computer-software field.

The computer-readable record media include a hardware especially designed to store and execute the program command, for example, magnetic media such as hard disk, floppy disk and magnetic tape, optical media such as CD-ROM and DVD, magneto-optical media such as floptical disk, ROM, RAM, flash memory, and etc. Meanwhile, the record media may be transmission media, for example, optical wire, a metal wire, or a waveguide including carrier wave to transmit a signal for designating the program command and data structure.

Also, the program command may include a high-level language code to be executed by the computer through the use of interpreter as well as a machine language code made by a compiler. In order to execute this operation, the aforementioned hardware apparatus may be operated as one or more software module, or the contrary case is also in the same manner.

Thus, it should be understood that the aforementioned embodiments of the present invention are for purpose of illustration, and are not to be constructed as limitations of the invention. It is intended that the present invention covers the modifications and variations of this invention provided they come within the scope of the appended claims and their equivalents.

What is claimed is:

1. A method for supporting a Multicast and Broadcast Service (MBS) in a base station (BS), the method comprising:
   receiving a first path register request message from an access service network gateway (ASN-GW), wherein the first path register request message include a first service flow identifier (SFID) regarding a first MBS service flow for a first mobile station (MS);
   assigning a first Generic Routing Encapsulation (GRE) key to a first MBS service flow;
   transmitting a first register response message including the first GRE key in response to the first path register request message;
   creating a GRE tunnel delivering first MBS contents associated with the first MBS service flow by using the first GRE key;
   receiving the first MBS contents through the GRE tunnel from the ASN-GW;
   receiving a second path register request message from the ASN-GW, wherein the second path register request message include a second SFID regarding a second MBS service flow for a second MS;
   determining whether the first MBS service flow and the second MBS service flow are associated with a same MBS service flow; and
   if the first MBS service flow and the second service flow are associated with the same MBS service flow, assigning the first GRE key to the second MBS service flow without creating an additional GRE tunnel for the second MBS service flow, transmitting a second register response message including the first GRE key in response to the second path register request message, and
   receiving second MBS contents associated with the second MBS service flow through the GRE tunnel from the ASN-GW,
   wherein the assigning the first GRE key is performed based on both per BS granularity and per service flow granularity,
   wherein the GRE tunnel is created between the BS and the ASN-GW.

2. The MBS supporting method according to claim 1, wherein the first path register request message further include a first multicast SFID, the first multicast SFID is generated by the ASN-GW based on first address information elements associated with the first MBS service flow, the first address information elements include a first source Internet Protocol (IP) address, a first destination IP address, a first source port, and a first destination port,
   wherein the second path register request message further include a second multicast SFID, the second multicast SFID is generated by the ASN-GW based on second address information elements associated with the second MBS service flow, the second address information elements include a second source IP address, a second destination IP address, a second source port, and a second destination port,
   wherein the first MBS service flow and the second MBS service flow are associated with a same MBS service flow when values of the first multicast SFID and the second multicast SFID are same, and
   wherein
   the first GRE key is assigned to the first MBS service flow and the second MBS service flow based on the same valued multicast SFIDs.

3. The MBS supporting method according to claim 1, wherein the first path register request message further include a first Multicast Connection Identifier (MCID) and a first MBS zone ID, the first MCID is generated by the ASN-GW based on the first SFID, the first MBS zone ID identifies a first MBS zone associated with the first MBS service flow,
   wherein the second path register request message further include a second MCID and a second MBS zone ID, the second MCID is generated by the ASN-GW based on the second SFID, the second MBS zone ID identifies a second MBS zone associated with the second MBS service flow,
   wherein the first MBS service flow and the second MBS service flow are associated with a same MBS service flow both when values of the first MCID and the second MCID are same and when values of the first MBS zone ID and the second MBS zone ID are same, and
   wherein the first GRE key is assigned to the first MBS service flow and the second MBS service flow based on both the same valued MCIDs and the same valued MBS zone IDs.

4. The MBS supporting method according to claim 3, wherein, the first MBS service flow and the second MBS service flow are not associated with a same MBS service flow when values of the first MCID and the second MCID are same, but when values of the first MBS zone ID and the second MBS zone ID are not same.

5. The MBS supporting method according to claim 3, wherein the first path register request message further include a first data type information, the first data type information indicates that data needs to be delivered to the first MS is based on a unicast service or an MBS service,
   wherein the second path register request message further include a second data type information, the second data type information indicates that data needs to be delivered to the second MS is based on a unicast service or an MBS service.

6. The MBS supporting method according to claim 1, wherein the first path register request message further include first address information elements associated with the first MBS service flow, the first address information elements include a first source Internet Protocol (IP) address, a first destination IP address, a first source port, and a first destination port,
   wherein the second path register request message further include second address information elements associated with the second MBS service flow, the second address information elements include a second source IP address, a second destination IP address, a second source port, and a second destination port, and
wherein the first MBS service flow and the second MBS service flow are associated with a same MBS service when values of the first SFID and the second SFID are not same, but when the first address information elements and the second elements information are same.

7. The MBS supporting method according to claim 6, wherein each of the first SFID and the second SFID are given by different anchor ASN-GWs to which entries of each of the first MS and the second MS are performed.

8. The MBS supporting method according to claim 1, wherein the first path register request message further include first address information elements associated with the first MBS service flow, the first address information elements include a first source Internet Protocol (IP) address, a first destination IP address, a first source port, and a first destination port,
wherein the second path register request message further include second address information elements associated with the second MBS service flow, the second address information elements include a second source IP address, a second destination IP address, a second source port, and a second destination port,
wherein the first GRE key is assigned to the second MBS service flow when values of the first SFID and the second SFID are not same, but when the first address information elements and the second elements information are same.

9. The MBS supporting method according to claim 8, wherein the second anchor ASN-GW and the third anchor ASN-GW are different.

10. A base station (BS) for supporting a Multicast and Broadcast Service (MBS) in a wireless communication system, the BS comprising:
a receiver configured for receiving a first path register request message from an access service network gateway (ASN-GW), wherein the first path register request message include a first service flow identifier (SFID) regarding a first MBS service flow for a first mobile station (MS);
a processor configured for assigning a first Generic Routing Encapsulation (GRE) key to a first MBS service flow based on both per BS granularity and per service flow granularity and creating
a GRE tunnel delivering first MBS contents associated with the first MBS service flow by using the first GRE key; and
a transmitter configured for transmitting a first register response message including the first GRE key in response to the first path register request message;
wherein the receiver receiving the first MBS contents through the GRE tunnel from the ASN-GW,
wherein the receiver receiving a second path register request message from the ASN-GW, wherein the second path register request message include a second SFID regarding a second MBS service flow for a second MS;
wherein the processor determines whether the first MBS service flow and the second service flow are associated with a same MBS service flow,
wherein if the first MBS service flow and the second service flow are associated with the same MBS service flow, the processor assigns the first GRE key to the second MBS service flow without creating an additional GRE tunnel for the second MBS service flow, the transmitter transmits a second register response message including the first GRE key in response to the second path register request message, and the receiver receives second MBS contents associated with the second MBS service flow through the GRE tunnel from the ASN-GW, and
wherein the GRE tunnel is created between the BS and the ASN-GW.

11. The network entity according to claim 10, wherein the first path register request message further include a first multicast SFID, the first multicast SFID is generated by the ASN-GW based on first address information elements associated with the first MBS service flow, the first address information elements include a first source Internet Protocol (IP) address, a first destination IP address, a first source port, and a first destination port,
wherein the second path register request message further include a second multicast SFID, the second multicast SFID is generated by the ASN-GW based on second address information elements associated with the second MBS service flow, the second address information elements include a second source IP address, a second destination IP address, a second source port, and a second destination port,
wherein the processor determines that the first MBS service flow and the second MBS service flow are associated with a same MBS service flow when values of the first multicast SFID and the second multicast SFID are same,
wherein the processor assigns the first GRE key to the first MBS service flow and the second MBS service flow based on the same valued multicast SFIDs.

12. The network entity according to claim 10, wherein the first path register request message further include a first Multicast Connection Identifier (MCID) and a first MBS zone ID, the first MCID is generated by the ASN-GW based on the first SFID, the first MBS zone ID identifies a first MBS zone associated with the first MBS service flow,
wherein the second path register request message further include a second MCID and a second MBS zone ID, the second MCID is generated by the ASN-GW based on the second SFID, the second MBS zone ID identifies a second MBS zone associated with the second MBS service flow,
wherein the processor determines that the first MBS service flow and the second MBS service flow are associated with a same MBS service flow both when values of the first MCID and the second MCID are same and when values of the first MBS zone ID and the second MBS zone ID are same,
wherein the processor assigns the first GRE key to the first MBS service flow and the second MBS service flow based on both the same valued MCIDs and the same valued MBS zone IDs.

13. The network entity according to claim 12, wherein, the processor determines that the first MBS service flow and the second MBS service flow are not associated with a same MBS service flow when values of the first MCID and the second MCID are same, but when values of the first MBS zone ID and the second MBS zone ID are not same.

14. The network entity according to claim 12, wherein the first path register request message further include a first data type information, the first data type information indicates that data needs to be delivered to the first MS is based on a unicast service or an MBS service, and
wherein the second path register request message further include a second data type information, the second data type information indicates that data needs to be delivered to the second MS is based on a unicast service or an MBS service.

15. The network entity according to claim 10, wherein the first path register request message further include first address information elements associated with the first MBS service flow, the first address information elements include a first source Internet Protocol (IP) address, a first destination IP address, a first source port, and a first destination port,
   wherein the second path register request message further include second address information elements associated with the second MBS service flow, the second address information elements include a second source IP address, a second destination IP address, a second source port, and a second destination port,
   wherein the processor determines that the first MBS service flow and the second MBS service flow are associated with a same MBS service when values of the first SFID and the second SFID are not same, but when the first address information elements and the second elements information are same.

16. The network entity according to claim 15, wherein each of the first SFID and the second SFID are given by different anchor ASN-GWs to which entries of each of the first MS and the second MS are performed.

17. A method for supporting a Multicast and Broadcast Service (MBS) in a first access service network gateway (ASN-GW), the method comprising:
   receiving a first service flow identifier (SFID) regarding a first MBS service flow for a first mobile station (MS) from a second anchor ASN-GW to which network entry of the first MS is performed;
   generating a first path register request message including the first SFID;
   transmitting the first path register request message to a base station (BS);
   receiving, from the BS, a first path register response message including a first GRE key assigned to the first MBS service flow by the BS;
   creating a GRE tunnel delivering first MBS contents associated with the first MBS service flow by using the first GRE key;
   transmitting the first MBS contents through the GRE tunnel from to the BS;
   receiving a second SFID regarding a second MBS service flow for a second MS from a third anchor ASN-GW to which network entry of the second MS is performed;
   generating a second path register request message including the second SFID;
   transmitting the second path register request message to the BS;
   receiving, from the BS, a second path register response message including the first GRE key assigned to the second MBS service flow by the BS;
   wherein the first GRE key is assigned based on both per BS granularity and per service flow granularity,
   wherein the GRE tunnel is created between the BS and the first ASN-GW.

18. The MBS supporting method according to claim 17, further comprising:
   generating a first multicast SFID based on first address information elements associated with the first MBS service flow, the first address information elements include a first source Internet Protocol (IP) address, a first destination IP address, a first source port, and a first destination port; and
   generating a second multicast SFID based on second address information elements associated with the second MBS service flow, the second address information elements include a second source IP address, a second destination IP address, a second source port, and a second destination port,
   wherein the first path register request message further include the first multicast SFID,
   wherein the second path register request message further include the second multicast SFID,
   wherein the first GRE key is assigned based on the multicast SFID.

19. The MBS supporting method according to claim 17, further comprising:
   generating a first Multicast Connection Identifier (MCID) based on the first SFID, and generating a first MBS zone ID identifying a first MBS zone associated with the first MBS service flow; and
   generating a second MCID based on the second SFID, and generating a second MBS zone ID identifying a second MBS zone associated with the second MBS service flow,
   wherein the first path register request message further include the first MCID and the first MBS zone ID,
   wherein the second path register request message further include the second MCID and the second MBS zone ID,
   wherein the first MBS service flow and the second MBS service flow are associated with a same MBS service flow both when values of the first MCID and the second MCID are same and when values of the first MBS zone ID and the second MBS zone ID are same,
   wherein the first GRE key is assigned to the first MBS service flow and the second MBS service flow based on both the same valued MCIDs and the same valued MBS zone IDs,
   wherein the first GRE key is assigned based on both the MCID and the MBS zone ID.

20. The MBS supporting method according to claim 19, further comprising:
   generating a first data type information indicating that data needs to be delivered to the first MS is based on a unicast service or an MBS service; and
   generating a second data type information indicating that data needs to be delivered to the first MS is based on the unicast service or an MBS service,
   wherein the first path register request message further include the first data type information,
   wherein the second path register request message further include the second data type information.

* * * * *